(12) United States Patent
Carollo et al.

(10) Patent No.: US 9,108,149 B2
(45) Date of Patent: Aug. 18, 2015

(54) AIR DEHYDRATING BREATHER ASSEMBLY FOR PROVIDING DEHUMIDIFIED AIR TO ELECTRICAL DEVICES, AND RELATED METHOD

(71) Applicant: ABB Technology AG, Zürich (CH)

(72) Inventors: Carlo Carollo, Thiene (IT); Andrea Tonin, Brogliano (IT)

(73) Assignee: ABB TECHNOLOGY AG, Zurich (CH)

( * ) Notice: Subject to any disclaimer, the term of this patent is extended or adjusted under 35 U.S.C. 154(b) by 53 days.

(21) Appl. No.: 14/057,486

(22) Filed: Oct. 18, 2013

(65) Prior Publication Data
US 2014/0053723 A1 Feb. 27, 2014

Related U.S. Application Data

(63) Continuation of application No. PCT/EP2012/056655, filed on Apr. 12, 2012.

(30) Foreign Application Priority Data

Apr. 20, 2011 (EP) .................................... 11163153

(51) Int. Cl.
| | |
|---|---|
| B01D 53/26 | (2006.01) |
| B01D 53/04 | (2006.01) |
| H01F 27/14 | (2006.01) |

(52) U.S. Cl.
CPC .......... *B01D 53/261* (2013.01); *B01D 53/0446* (2013.01); *H01F 27/14* (2013.01);
(Continued)

(58) Field of Classification Search
CPC .. B01D 53/04; B01D 53/261; B01D 53/0446; B01D 2253/106; B01D 2257/80; B01D 2258/06; B01D 2259/40096; H01F 27/14

USPC ........ 95/1, 8, 11, 117, 126; 96/109, 111, 121, 96/146; 34/80, 472, 473
See application file for complete search history.

(56) References Cited

U.S. PATENT DOCUMENTS 2,505,581 A * 4/1950 Unger .......................... 174/14 R
3,559,382 A 4/1968 Jaggard et al.
(Continued)

FOREIGN PATENT DOCUMENTS

| | | |
|---|---|---|
| DE | 201 06 617 U1 | 6/2001 |
| JP | 60-198710 A | 10/1985 |

(Continued)

OTHER PUBLICATIONS

International Search Report (PCT/ISA/210) mailed on Jun. 20, 2012, by the European Patent Office as the International Searching Authority for International Application No. PCT/EP2012/056655.
(Continued)

*Primary Examiner* — Frank Lawrence
(74) *Attorney, Agent, or Firm* — Buchanan Ingersoll & Rooney PC

(57) ABSTRACT

An air dehydrating breather assembly and method provide dehumidifying air suitable to be supplied into oil expansion vessels used in electrical devices. The air dehydrating breather assembly includes first and second air demoisturizer units respectively associated with two corresponding oil expansion vessels. The first air demoisturizer unit includes a first tank housing moisture absorber and a second tank housing moisture absorber alternatively providing dehumidified air. The second air demoisturizer unit includes a third tank housing moisture absorber providing dehumidified air. Sensors are associated with the first, second and third tanks to detect the level of saturation of their moisture absorbers. An electronic processing unit is operatively associated with the sensors for routing dehumidified air to the associated oil-expansion vessels from the tanks whose moisture absorbers are not saturated.

20 Claims, 8 Drawing Sheets

(52) U.S. Cl.
CPC ....... *B01D2253/106* (2013.01); *B01D 2257/80* (2013.01); *B01D 2258/06* (2013.01); *B01D 2259/40096* (2013.01)

(56) References Cited

U.S. PATENT DOCUMENTS

| | | | |
|---|---|---|---|
| 4,543,446 A * | 9/1985 | Foss et al. | 174/11 R |
| 5,902,381 A * | 5/1999 | Golner et al. | 96/146 |
| 6,709,496 B2 | 3/2004 | Viereck et al. | |
| 7,332,015 B2 * | 2/2008 | Golner et al. | 95/10 |
| 2005/0103195 A1 | 5/2005 | Golner | |
| 2005/0268481 A1 | 12/2005 | Wiedl et al. | |
| 2006/0162304 A1 | 7/2006 | Eichert et al. | |

FOREIGN PATENT DOCUMENTS

| | | |
|---|---|---|
| WO | WO 2004/043574 A1 | 5/2004 |
| WO | WO 2004/088679 A2 | 10/2004 |
| WO | WO 2005/055255 A1 | 6/2005 |
| WO | WO 2006/069360 A2 | 6/2006 |
| WO | WO 2009/019733 A1 | 2/2009 |

OTHER PUBLICATIONS

Written Opinion (PCT/ISA/237) mailed on Jun. 20, 2012, by the European Patent Office as the International Searching Authority for International Application No. PCT/EP2012/056655.

* cited by examiner

AIR DEHYDRATING BREATHER ASSEMBLY FOR PROVIDING DEHUMIDIFIED AIR TO ELECTRICAL DEVICES, AND RELATED METHOD

RELATED APPLICATIONS

This application claims priority as a continuation application under 35 U.S.C. §120 to PCT/EP2012/06655, which was filed as an International Application on Apr. 12, 2012 designating the U.S., and which claims priority to European Application 11163153.7 filed in Europe on Apr. 20, 2011. The entire contents of these applications are hereby incorporated by reference in their entireties.

FIELD

The present disclosure relates to an air-dehydrating breather assembly for providing dehumidified air suitable to be supplied into oil expansion vessels of power electrical devices, and to a related method.

BACKGROUND INFORMATION

It is known in the electrical field that air dehydrating breathers are used in connection with electrical devices having oil expansion vessels, such as power transformers, on load tap changers, chokes, etc.

These oil-expansion vessels, which are constituted, for example, by oil conservators in the case of power transformers, have the function of compensating for the unavoidable volume changes of insulating oil used in such electrical devices, which volume changes result from temperature fluctuations. To this end, oil expansion vessels are supplied with air previously treated in a suitable air breather, also indicated as dryer or demoisturizer or dehumidifier or similar terms, so as to eliminate or drastically reduce its humidity, in order to prevent a reduction of the breakdown voltage of the insulating oil.

According to known solutions, an air breather includes a tank inside which there is an air absorbing agent which removes humidity from the air entering into the tank. Then, the dehumidified air is routed into the oil expansion vessel of an associated power electrical device.

The humidity absorbing agents can be divided in general in two groups: those which cannot be regenerated and exhaust their absorbing capabilities after a certain working life, for examples zeolites, and hence must be replaced sooner or later; and those instead, such as silica gels, which can be regenerated at least for a certain number of times.

WO 2005/055255 discloses, for example, an air dehydrating assembly of a known type, in which a dehumidifying tank has an inlet for the air to be dehumidified, an outlet for dehumidified air, and moisture absorption means consisting of a plurality of granules or salts that can be thermally regenerated and are suitable to dehumidify air coming from outside.

Another example of an air demoisturizer for oil-insulated transformers, chokes, and tap changers with a heat-regenerable absorbent is disclosed in U.S. Pat. No. 6,709,496.

Although known air breathers perform their basic functions in a quite satisfying way, there is still a desire and room for further improvements, such as with regard to their flexibility of use, especially when there are more oil expansion vessels used in the same electrical device or power application.

Exemplary embodiments of the present disclosure fulfil this desire by providing an air dehydrating breather assembly and a method for dehumidifying air suitable to be supplied into oil expansion vessels of power electrical devices as described hereinafter.

SUMMARY

An exemplary embodiment of the present disclosure provides an air dehydrating breather assembly for dehumidifying air suitable to be supplied into oil expansion vessels used in electrical devices. The exemplary air dehydrating breather assembly includes a first air demoisturizer unit configured to be connected in fluid communication with a first associated oil expansion vessel. The first air demoisturizer unit includes: (i) a first tank including first moisture absorbing means, one or more inlet openings configured to allow a flow of air to be dehumidified into the first tank, and one or more outlet openings configured to allow a flow of dehumidified air out from the first tank; (ii) a second tank including second moisture absorbing means, one or more second inlet openings configured to allow a flow of air to be dehumidified into the second tank, and one or more second outlet openings configured to allow a flow of dehumidified air out from the second tank; (iii) a first sensor operatively associated with at least the first tank and configured to detect a level of saturation of the first moisture absorbing means; and (iv) first valve means operatively associated with and configured to allow a flow of dehumidified air from the first tank or the second tank. The exemplary air dehydrating breather assembly also includes a second air demoisturizer unit configured to be connected in fluid communication with a second associated oil expansion vessel and with the first demoisturizer unit. The second demoisturizer unit includes: (i) a third tank including third moisture absorbing means, one or more third inlet openings configured to allow a flow of air to be dehumidified into the third tank, and one or more third outlet openings configured to allow a flow of dehumidified air out from the first tank; (ii) a second sensor operatively associated with the third tank and configured to detect a level of saturation of the third moisture absorbing means; and (iii) second valve means operatively associated with the third tank. In addition, the exemplary air dehydrating breather assembly includes electronic means operatively associated with the first sensor and the second sensor. The electronic means is configured to at least one of: (i) actuate the first valve means and cause the flow of dehumidified air from the second tank towards the first oil expansion vessel when the detected level of saturation of the first moisture absorbing means exceeds a predetermined first threshold; and (ii) actuate the second valve means and cause the flow of dehumidified air from the first demoisturizer unit towards the second oil expansion vessel when the detected level of saturation of the third moisture absorbing means exceeds a predetermined second threshold.

An exemplary embodiment of the present disclosure provides a method for dehumidifying air suitable to be supplied into oil expansion vessels of electrical devices. The exemplary method includes arranging a first air demoisturizer unit to be connected in fluid communication with a first associated oil expansion vessel, and arranging a second air demoisturizer unit to be connected in fluid communication with a second associated oil expansion vessel and with the first demoisturizer unit. The first air demoisturizer unit includes: (i) a first tank containing a first moisture absorber, one or more inlet openings for allowing a flow of air to be dehumidified into the first tank, and one or more outlet openings for allowing flow of dehumidified air out from the first tank; (ii) a second tank containing a second moisture absorber, one or more second inlet openings for allowing a flow of air to be dehumidified into the second tank, and one or more second outlet openings for allowing a flow of dehumidified air out from the second tank; (iii) a first sensor operatively associated with at least the first tank for detecting a level of saturation of the first moisture absorber; and (iv) a first valve operatively associated with and configured to allow a flow of dehumidified air from the first tank or the second tank. The second demoisturizer unit includes: (i) a third tank containing a third moisture absorber, one or more third inlet openings for allowing a flow of air to be dehumidified into the third tank, and one or more third outlet openings for allowing a flow of dehumidified-air out from the first tank; (ii) a second sensor operatively associated with the third tank for detecting a level of saturation of the third moisture absorber; and (iii) a second valve means operatively associated with the third tank. The exemplary method includes, in whichever order, actuating, by an associated electronic processing unit, (i) the first valve and causing the flow of dehumidified air from the second tank towards the first oil expansion vessel when the detected level of saturation of the first moisture absorber exceeds a predetermined first threshold; and (ii) the second valve and causing the flow of dehumidified air from the first demoisturizer unit towards the second oil expansion vessel when the detected level of saturation of the third moisture absorber exceeds a predetermined second threshold.

BRIEF DESCRIPTION OF THE DRAWINGS

Additional refinements, advantages and features of the present disclosure are described in more detail below with reference to exemplary embodiments illustrated in the drawings, in which.

Figure 1:
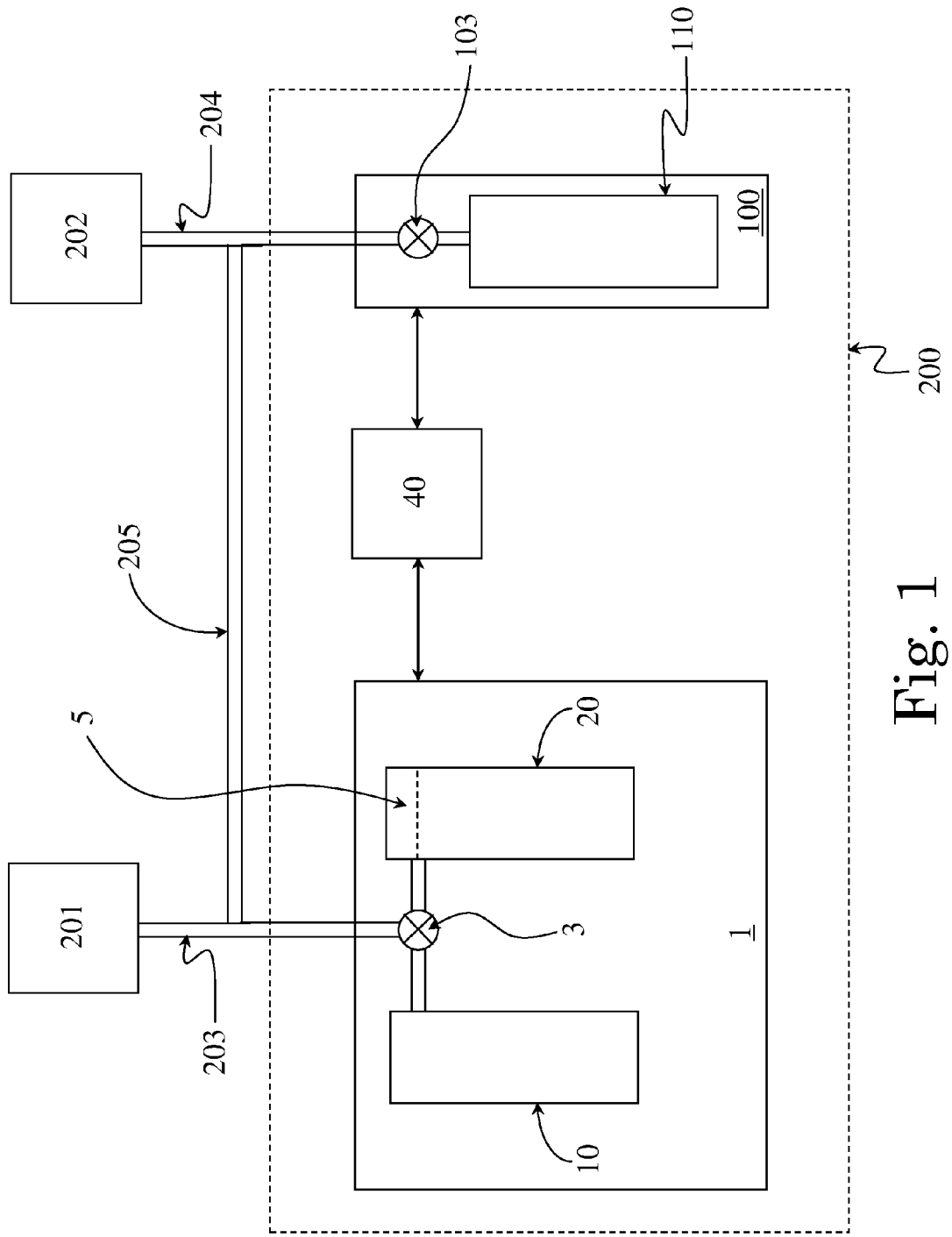
FIG. 1 is a schematic block diagram illustrating an air dehydrating assembly according to an exemplary embodiment of the present disclosure.

It should be noted that in the detailed description that follows, identical or similar components have the same reference numerals, regardless of whether they are shown in different exemplary embodiments of the present disclosure. It should also be noted that in order to clearly and concisely disclose the exemplary embodiments of the present disclosure, the drawings may not necessarily be to scale and certain features of the present disclosure can be shown in a somewhat schematic form.

DETAILED DESCRIPTION

FIG. 1 schematically shows a dehydrating breather assembly according to an exemplary embodiment of the present disclosure globally indicated by reference number 200. The dehydrating breather assembly 200 is operatively connected to a first oil expansion vessel 201 and to a second oil expansion vessel 202. For example, the oil expansion vessels 201, 202 can each be constituted by a conservator of an associated oil-insulated power transformer. Such oil expansion vessels can be associated with other electrical devices, for example, tap changers, or can be used with a unique electrical device. For example, the first expansion vessel 201 can be the oil conservator of a power transformer, and the second expansion vessel 202 can be the oil conservator of the on-load tap changer of the same power transformer.

As illustrated, the air breather assembly 200 includes a first air demoisturizer unit 1 which is configured to be connected in fluid communication with the associated first oil expansion vessel 201 by means of a first pipe 203, and a second air demoisturizer unit 100 which is structurally distinct from the first demoisturizer unit 1 and is configured to be connected in fluid communication with the associated second oil expansion vessel 202 by means of a second pipe 204 and with the first demoisturizer unit 1 by means of a third pipe 205.

The first air demoisturizer unit 1 includes a first tank 10 and a second tank 20 which are operatively associated with each other.

Figure 2:
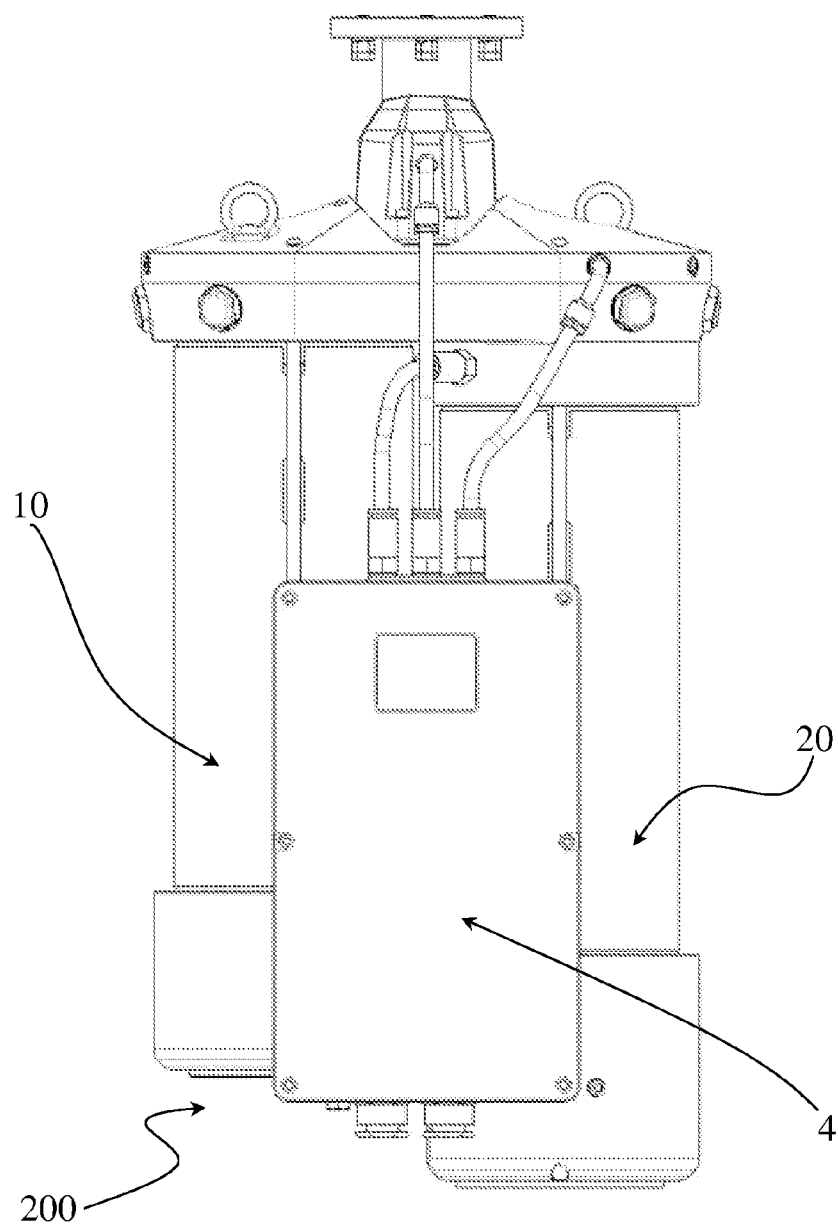
FIG. 2 is a perspective view showing an exemplary embodiment of an air demoisturizer unit which can be used in the breather assembly according to the present disclosure.

According to known solutions which are not described in detail herein, the first demoisturizer unit 1 can also include an outer protective casing surrounding the two tanks 10, 20, and/or be provided with flanges for mechanical connection to other components such as the pipe 203 and/or parts of the associated electrical device, as illustrated in FIG. 2, for example.

In the exemplary embodiments illustrated in FIGS. 1-3 and 7, the two tanks 10, 20 of the first air demoisturizer unit 1 are placed side by side. According to another, more compact exemplary embodiment illustrated in FIG. 4, the two tanks 10, 20 are placed one inside the other. In the example illustrated in FIG. 4, the tanks 10, 20 are placed one inside the other coaxially since the two illustrated tanks 10, 20 have a substantially cylindrical shape.

Figure 3:
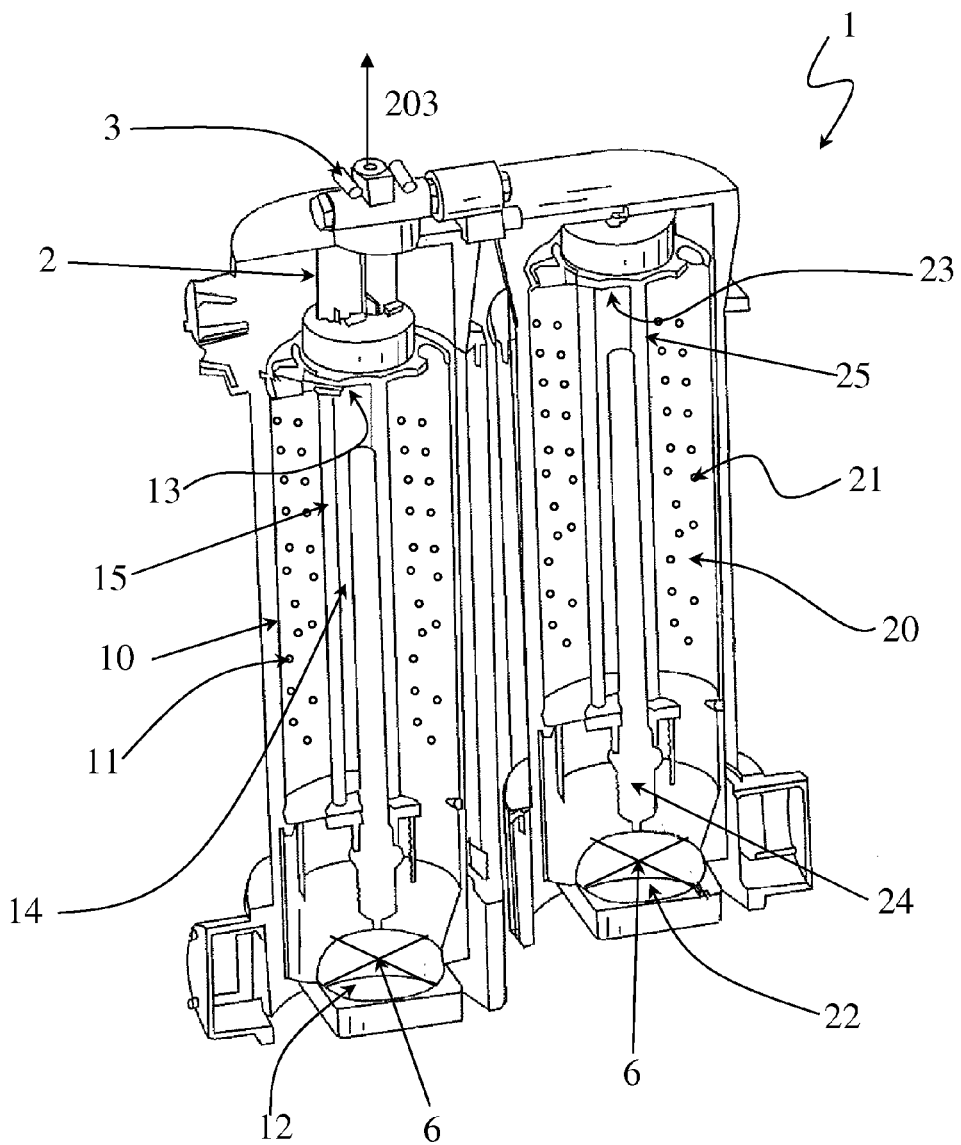
FIG. 3 is a perspective showing the demoisturizer unit of FIG. 2 partially cut.
Figure 4:
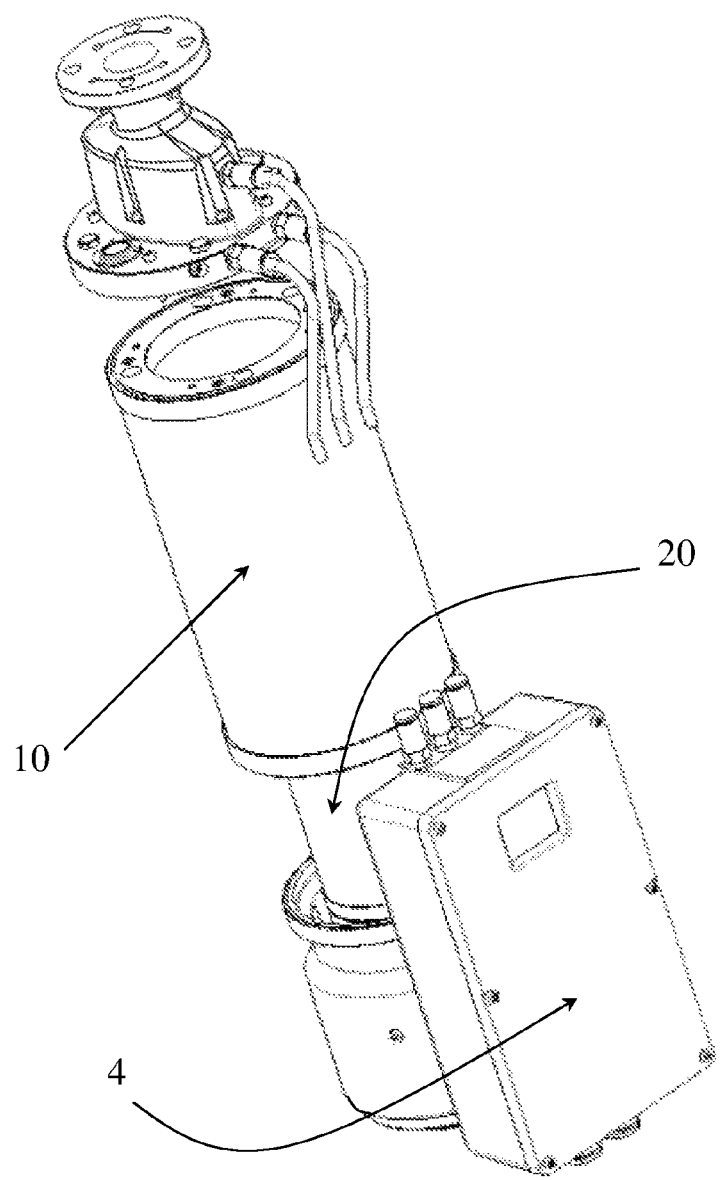
FIG. 4 is a perspective view showing an exemplary embodiment of an air demoisturizer unit which can be used in the breather assembly according to the present disclosure.

As illustrated in FIG. 3, for example, the first tank 10 includes first moisture absorbing means 11, one or more inlet openings 12 for allowing a flow of air to be dehumidified into the tank 10 itself, and one or more outlet openings 13 for allowing a flow of dehumidified air out from the first tank 10 towards the pipe 203.

As schematically illustrated in FIG. 3, ventilation means 6 (e.g., a fan) are operatively coupled to the first tank 10, for example, placed at the one or more first inlet openings 12 so as to ease circulation of air into and out from the first tank 10.

According to an exemplary embodiment, the first absorbing means 11 can be heat regenerable moisture absorbing means, such as, for example, a silica gel (e.g. Envirogel), and a first heater 14, such as an electrical resistance, is provided inside the first tank 10 for regenerating the first moisture absorbing means 11 as it will be described in more detail hereinafter.

A temperature sensor 15 can be placed inside the tank in order to monitor the temperature of the heater 14.

In turn, the second tank 20 includes second moisture absorbing means 21, one or more second inlet openings 22 for allowing a flow of air to be dehumidified into the second tank 20 itself, and one or more second outlet openings 23 for allowing a flow of dehumidified air out from the second tank 20 towards the pipe 203.

As illustrated in FIG. 3, ventilation means 6 (e.g., a fan) are also operatively coupled to the second tank 20, for example, placed at the one or more second inlet openings 22 so as to ease circulation of air into and out from the second tank 20.

According to an exemplary embodiment, the second absorbing means 21 are heat regenerable moisture absorbing means, such as, for example, a silica gel (e.g. Envirogel), and a first heater 24, such an electrical resistance, is provided inside the second tank 20 for regenerating the second moisture absorbing means 21 as it will be also described in more detail hereinafter.

Also, a temperature sensor 25 can be placed inside the tank 20 in order to monitor the temperature of the heater 24.

Collection sumps or similar devices can be also provided to discharge condensate outside the tanks 10, 20 according to solutions which are readily available for those skilled in the art and therefore not further described herein.

As illustrated in more detail in FIG. 3, the first demoisturizer unit 1 includes a first sensor 2 operatively associated with the first tank 10 for detecting the level of saturation of the first moisture absorbing means 11. In the exemplary embodiment illustrated in FIG. 3, the first sensor 2 includes an electronic load cell which is mechanically coupled with the tank 10, for example, by means of fastening means of traditional type, and measures the level of saturation of the first absorption means 11 contained into the tank 10.

The electronic load cell 2 can be of the compression type (converting a force applied into an electrical resistance change) or of the traction type (converting a stretch into an electrical resistance change).

If desired, a further temperature sensor (not illustrated) can be associated with the sensor 2.

First valve means 3, such as, for example, an electric or electromagnetic valve (e.g., a solenoid valve), are operatively associated with the tanks 10, 20, and are configured to allow a flow of dehumidified air into the pipe 203 (or even into the pipe 205) from the first tank 10 or alternately from the second tank 20.

Figure 5:
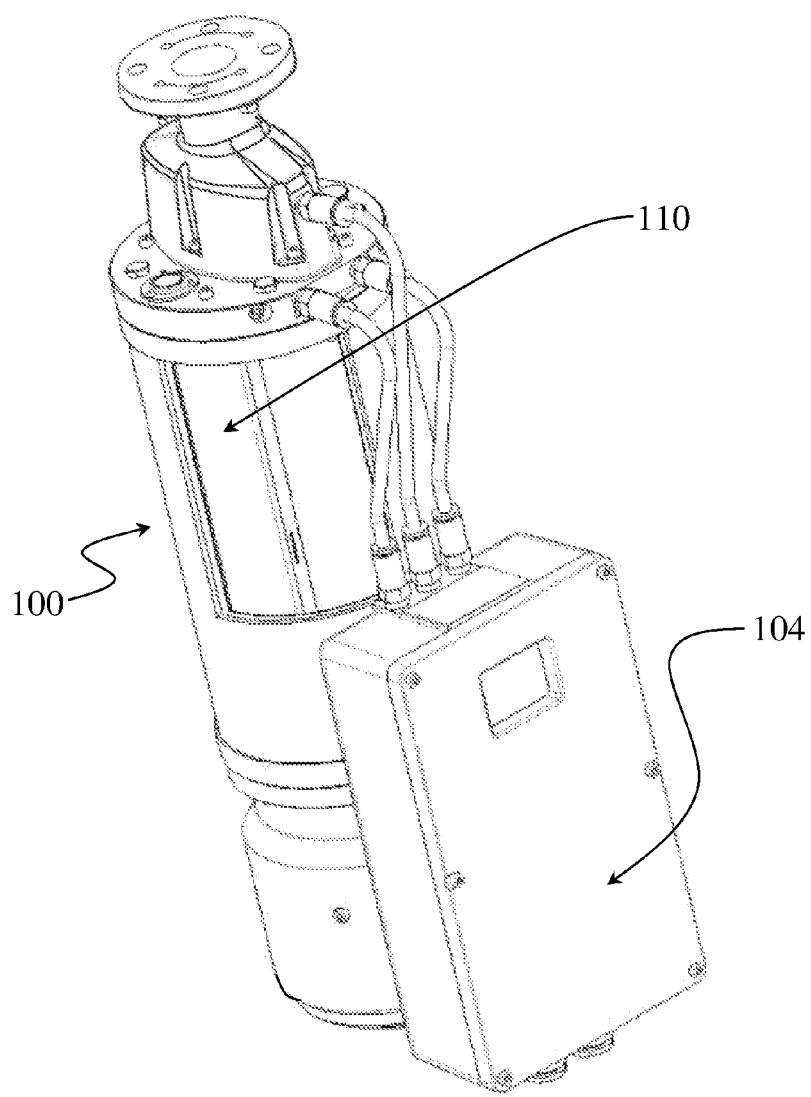
FIG. 5 is a perspective view showing an additional demoisturizer unit used in the breather assembly according to the present disclosure.
Figure 6:
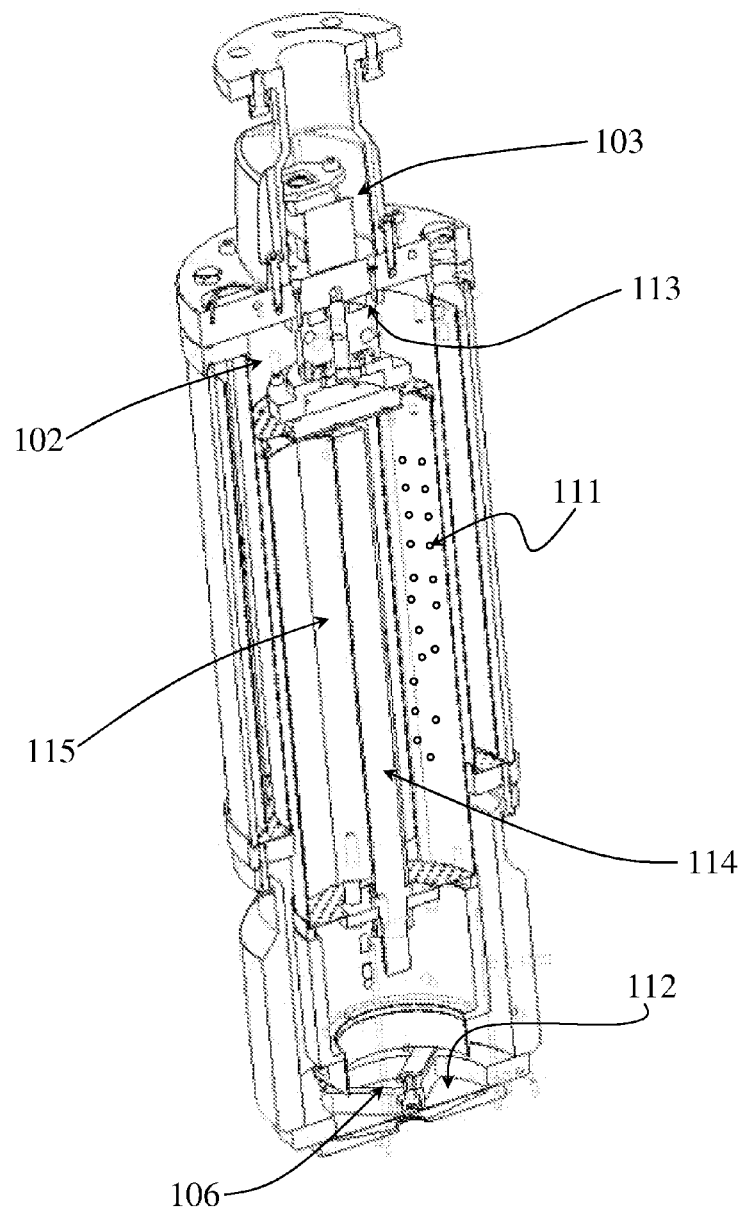
FIG. 6 is a perspective showing the demoisturizer unit of FIG. 4 partially cut.
Figure 7:
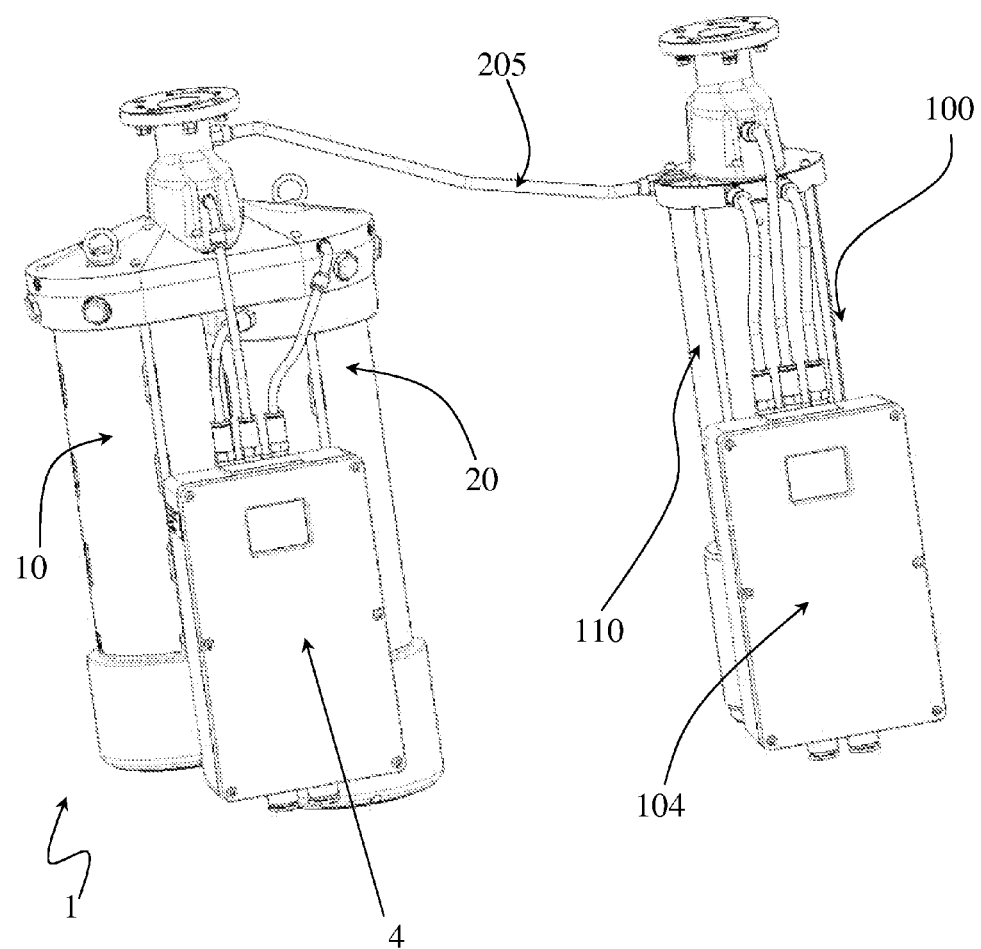
FIG. 7 is a perspective view showing an exemplary embodiment of an air dehydrating assembly according to the present disclosure.

As illustrated in the exemplary embodiments of FIGS. 5-6, the second demoisturizer unit 100 includes a third tank 110 which (for example, similar to the first tank 10) includes third moisture absorbing means 111, one or more third inlet openings 112 for allowing a flow of air to be dehumidified into the third tank 110, and one or more third outlet openings 113 for allowing a flow of dehumidified air out from the first tank 110 towards the second pipe 204 (or even the third pipe 205).

Ventilation means 106 (e.g., a fan) are operatively coupled to the third tank 110, for example, placed at the one or more third inlet opening 112, so as to ease circulation of air into and out from the third tank 110.

According to known solutions which are not described in detail herein, the second demoisturizer unit 100 can also include an outer protective casing surrounding the tank, and/or be provided with flanges for mechanical connection to other components such as the pipe 204 and/or parts of an associated electrical device, and a collection sump or similar device for discharging condensate outside the tank 110.

According to the exemplary embodiment illustrated in FIGS. 5 and 6, the third absorbing means 111 are heat regenerable moisture absorbing means, such as, for example, a silica gel (e.g. Envirogel), and a third heater 114, such an electrical resistance, is provided inside the third tank 110 for regenerating the third moisture absorbing means 111 as it will be described in more detail hereinafter.

A temperature sensor 115 can be placed inside the tank 110 in order to monitor the temperature of the heater 114.

In at least some of the illustrated exemplary embodiments, the second air demoisturizer unit 100 includes a second sensor 102 which is operatively associated with the third tank 110 in order to detect the level of saturation of the third moisture absorbing means 111.

According to an exemplary embodiment, the second sensor 102 includes an electronic load cell which is mechanically coupled with the tank 110, for example, by means of fastening means of traditional type. The sensor 102 measures the level of saturation of the third absorption means 111 contained into the third tank 110.

Also, in this case, if desired, a temperature sensor can be associated with the sensor 102.

The electronic load cell 102 can be, for example, of the compression type (converting a force applied into an electrical resistance change) or of the traction type (converting a stretch into an electrical resistance change).

Second valve means 103, such as, for example, an electric or electromagnetic valve (e.g., a solenoid valve), are operatively associated with the tank 110 and are configured to allow a flow of dehumidified air into the pipe 204 coming from the third tank 110 or alternately from the first air demoisturizer 1.

According to an exemplary embodiment, the air dehydrating breather assembly 200 also includes electronic means, schematically represented in FIG. 1 by reference number 40. The electronic means 40 are operatively connected to the first sensor 2 and to the second sensor 102. The electronic means 40 are arranged and configured to: actuate the first valve means 3 and cause the flow of dehumidified air into the first pipe 203 from the second tank 20 towards the associated first oil expansion vessel 201 when the detected level of saturation of the first moisture absorbing means 11 exceeds a predetermined first threshold (or vice versa); and/or actuate the second valve means 103 and cause the flow of dehumidified air into the second pipe 204 from the first demoisturizer unit 1 towards the associated second oil expansion vessel 202 when the detected level of saturation of the third moisture absorbing means 111 exceeds a predetermined second threshold.

The electronic means 40 can be constituted by a single electronic unit which is common to both demoisturizer units 1 and 100, as schematically represented in FIG. 1, and includes at least one programmable microcontroller (e.g., a processor such as a general purpose processor produced by Intel® or AMD®, for example, or an application specific processor) that is configured to execute an executable program and/or computer-readable instructions tangibly recorded on a non-transitory computer-readable recording medium (e.g., a nonvolatile memory such as ROM, a hard disk drive, flash memory, optical memory, etc.).

According to an exemplary embodiment illustrated in FIGS. 2-7, the electronic means 40 includes two separate units, namely a first electronic unit 4 including at least one programmable microcontroller which is part of the first air demoisturizer unit 1, and a second electronic unit 104 including at least one corresponding programmable microcontroller which is part of the second air demoisturizer unit 100. In this exemplary embodiment, the microcontrollers separately provided in the first and second electronic units 4, 104 can be of the type of microcontrollers as described above in the case where the electronic means 40 is constituted by a single electronic unit according to the exemplary embodiment of FIG. 1.

The microcontroller(s) can be of any suitable type available on the market.

According to an exemplary embodiment illustrated in FIGS. 2-7, the first electronic unit 4 is operatively connected to the first sensor 2 and is arranged and configured to actuate the first valve means 3 and cause the flow of dehumidified air into the first pipe 203 from the second tank 20 towards the associated first oil expansion vessel 201 when the detected level of saturation of the first moisture absorbing means 11 exceeds a predetermined first threshold.

Further, the first electronic unit 4 is arranged and configured to activate the first heater 14 and start a regenerating cycle of the first moisture absorbing means 11 while dehumidified air to be routed towards the associated first oil expansion vessel 201 is supplied from the second tank 20.

According to an exemplary embodiment, the first electronic unit 4 is also arranged and configured to actuate again the first valve means 3 and cause the flow of dehumidified air to be routed towards the associated first oil expansion vessel 201 again from the first tank 10 when the level of saturation of the first moisture absorbing means 11 detected by the sensor 2 drops below a predetermined third threshold.

According to an exemplary embodiment, the first and third thresholds are different from each other.

According to an exemplary embodiment, if the second moisture absorbing means 21 are regenerable, and the tank 20 is provided with regenerating means, such as the heater 24, for example, the first electronic unit 4 can be arranged and configured to activate the second heater 24 and start a regenerating cycle of the second moisture absorbing means 21 when dehumidified air to be routed towards the associated first oil expansion vessel 201 is supplied again from the first tank 10.

Such regenerating cycle of the second moisture absorbing means 21 can be started automatically by the first electronic unit 4 every time the second tank 20 has been used for supplying dehumidified air and just after the flow of dehumidified air is re-established from the first tank 10 upon completion of a regeneration cycle of the first absorbing means 11. Alternatively, such regenerating cycle can be started after a predetermined number of times the second tank 20 has been activated into operation for supplying dehumidified air while the first moisture absorbing means 11 were subject to corresponding regeneration cycles. According to an exemplary embodiment, a third sensor, schematically represented only in FIG. 1 by the reference number 5, can be operatively associated with the second tank 20 for detecting the level of saturation of the second moisture absorbing means 21. The third sensor can be an electronic load cell similar to the first and/or the second sensors 2, 102.

In this case, the first electronic unit 4 can be arranged and configured to actuate the first valve means 3 and cause the flow of dehumidified air again from the first tank 10 towards the associated first oil expansion vessel 201 when the level of saturation of the second moisture absorbing means 11 detected by the third sensor 5 exceeds a predetermined fourth threshold. Such a threshold can be the same as the first threshold (i.e. the two tanks 10, 20 and related components, including the first and second absorbing means 11, 21, and are identical or substantially similar), or the two thresholds can be different.

In turn, the second electronic unit 104 is operatively connected to the second sensor 102 and is arranged and configured to actuate the second valve means 103 and cause the flow of dehumidified air into the second pipe 204 from the first demoisturizer unit 1 and towards the associated second oil expansion vessel 202 when the level of saturation of the third moisture absorbing means 111 detected by means of the second sensor 102 exceeds a predetermined second threshold.

Depending on the applications, the second threshold can be the same, to some extent related to, or completely unrelated with respect to the first threshold.

Further, the second electronic unit 104 is arranged and configured to activate the third heater 114 and start a regeneration cycle of the third moisture absorbing means 111 while dehumidified air to be routed towards the associated second oil expansion vessel 202 is supplied from the demoisturizer unit 1, and from the tank (10 or 20) which is actually active at that time.

According to an exemplary embodiment, the second electronic unit 104 is arranged and configured to actuate the second valve means 103 and cause the flow of dehumidified air to be routed towards the associated second oil expansion vessel 202 again from the third tank 110 when the level of saturation of the third moisture absorbing means 111 detected by means of the second sensor 102 drops below a predetermined fifth threshold.

According to an exemplary embodiment, the second and fifth thresholds are different from each other.

Figure 8:
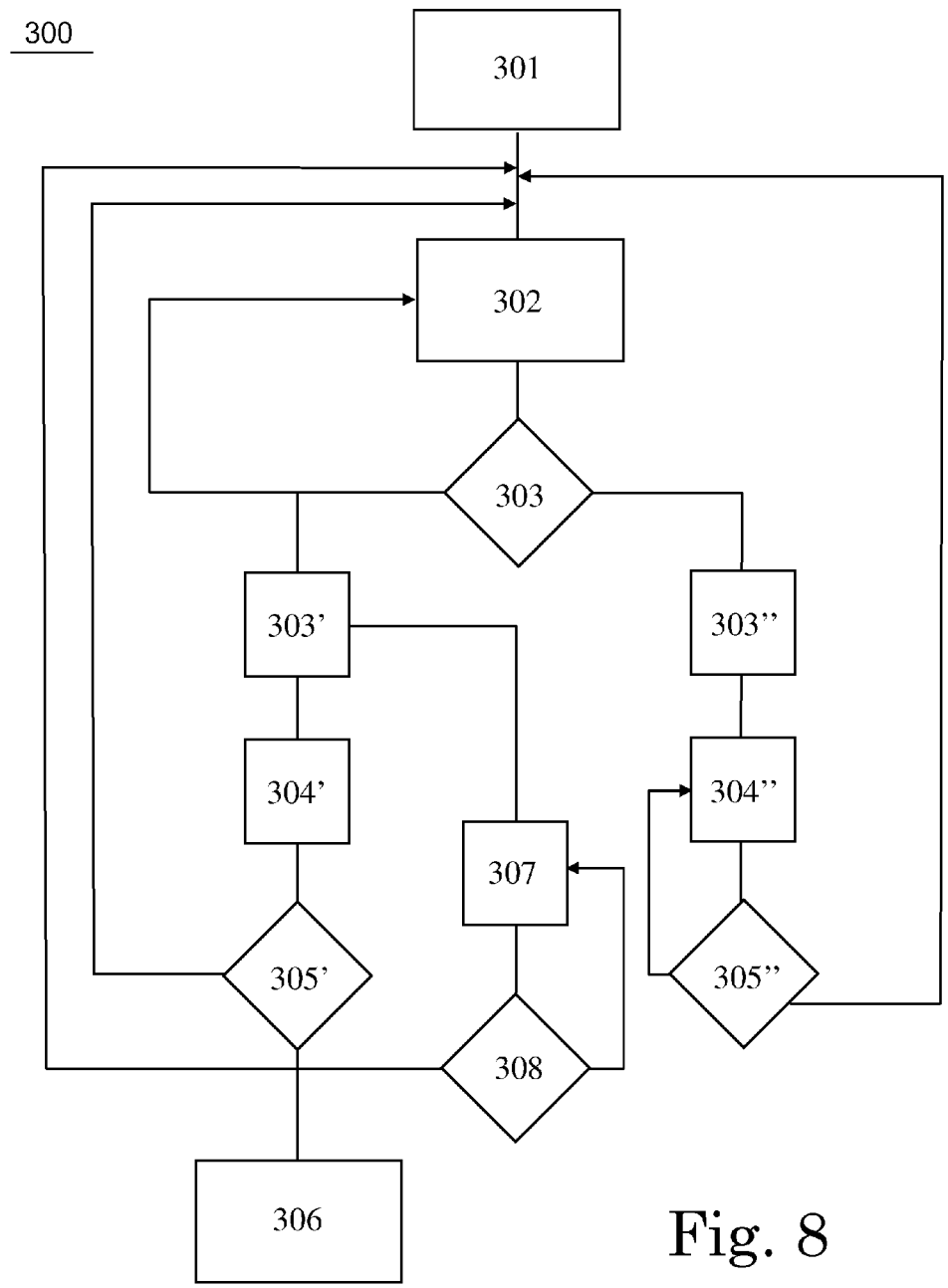
FIG. 8 is a block diagram schematically representing a method for dehumidifying air suitable to enter oil expansion vessels of power electrical devices according to the present disclosure.

In practice, in a method 300 according to an exemplary embodiment of the present disclosure illustrated in FIG. 8, at a first step 301, the two demoisturizer units 1 and 100 with their components and related electronic means (40, or 4 and 104) as previously described are provided, and properly connected in fluid communication to the corresponding oil expansion vessels 201, and 202 and to each other through the pipes 203, 204 and 205, respectively.

In operation, the third tank 101 of the second demoisturizer unit 100 and usually only one tank of the first demoisturizer unit 1, for example, the tank 10, are active while the second tank 20 is inactive.

At step 302, the first electronic means 4 and the second electronic means 104 (or the electronic means 40 if a unique electronic control unit is used) receive signals from the corresponding sensor 2, 102 which are indicative of the level of saturation of the first and third moisture absorbing means 11, 111, respectively.

For instance, according to the exemplary embodiments described above, the load cell 2 and the load cell 102 measure the mass value of the respective moisture absorbing means 11, 111 contained into the tanks 10 and 110, respectively.

Such values are each compared at step 303 with a respective threshold, namely the first threshold and the second threshold; steps 302 and 303 are iteratively repeated until one or both detected values exceed the respective thresholds.

If at least one of the levels detected exceeds the predetermined respective threshold, it means that the corresponding moisture absorbing means have reached a predetermined saturation level and the following occurs.

For example, when the detected level of saturation of the first moisture absorbing means 11 exceeds the predetermined first threshold, the first electronic unit 4 activates (step 303') the second tank 20 and actuates the first valve means 3 so as to cause the flow of dehumidified air into the first pipe 203 from the second tank 20 towards the associated first oil expansion vessel 201.

Likewise, when the detected level of saturation of the third moisture absorbing means 111 exceeds the predetermined second threshold, the second electronic unit 104 actuates (step 303") the second valve means 103 so as to cause the flow of dehumidified air into the second pipe 204 (through the interconnecting pipe 205) from the actually active tank 10 or 20 of the first demoisturizer unit 1 and towards the associated second oil expansion vessel 202.

Depending on the circumstances, such events at steps 303', 303" can occur in whichever order or even at the same time.

When the moisture absorbing means used inside the tanks 10, 110 (and also 20), are regenerable, the method according to the present disclosure can foresee the following further steps.

For instance, when the second tank 20 is the actually active tank for supplying dehumidified air, at step 304' the first electronic unit 4 activates the first heater 14 and starts regeneration of the first moisture absorbing means 11 while dehumidified air to be routed towards the associated first oil expansion vessel 201 is supplied from the second tank 20.

At step 305', while the regeneration cycle is under execution, the first electronic unit 4 continues to receive signals from the load cell 2 and compares the actual level of saturation of the first moisture absorbing means 11 with a predetermined third threshold which is different, for example, lower than the first threshold.

According to an exemplary embodiment, when the detected level of saturation of the first moisture absorbing means 11 drops below the predetermined third threshold, the first electronic unit 4 again actuates the first valve means 3 so as to restore the flow of dehumidified air to be routed towards the associated first oil expansion vessel 201 again from the first tank 10 thus going back to the situation of step 302.

If, according to one of the exemplary embodiments discussed above, the second moisture absorbing means 21 are also heat regenerable and therefore the second heater 24 is provided inside the second tank 20, the method according to the present disclosure foresees a further step 306 in which the first electronic unit 4 activates the second heater 24 and starts a regeneration cycle of the second moisture absorbing means 21 when dehumidified air to be routed towards the associated first oil expansion vessel 201 is supplied again from the first tank 10.

For instance, as previously mentioned, the regeneration cycle of the second moisture absorbing means 21 can be started automatically just after and every time flow of dehumidified air is restored from the first tank 10, or can be programmed to occur after a certain number of times the second tank 20 has been activated to provide dehumidified air.

According to an exemplary embodiment, if the second tank 20 and the first tank 10 are built up and used to some extent like twin components, the tank 20 is also provided with the third sensor 5 (e.g. a further electronic load cell) for detecting the level of saturation of the second moisture absorbing means 21. In this case, after step 303' and while the first absorbing means 11 are under regeneration, the method foresees a further step 307 in which the first electronic unit 4 receives the detected mass value of the third moisture absorbing means 21 contained into the tank 20 and compares them at step 308 with a fourth threshold. Steps 307, 308 are iteratively repeated until the detected values do not exceed the fourth threshold.

When the detected value exceeds the predetermined fourth threshold, it means that the second moisture absorbing means 21 have reached a predetermined saturation level. As a result, the first electronic unit 4 again actuates the first valve means 3 so as to restore the flow of dehumidified air to be routed towards the associated first oil expansion vessel 201 (or even towards the expansion vessel 202) again from the first tank 10 thus going back to the situation of step 102. In this exemplary embodiment, steps 307, 308 would replace step 305'. Step 308 would be followed by step 306 in which the first electronic unit 4 activates a regeneration cycle for the second moisture absorbing means 111.

In turn, after step 303", i.e. when dehumidified air is supplied to the second expansion vessel 202 from the first air demoisturizer unit 1, and from the tank 10 or 20 actually active in that phase, at step 304" the second electronic unit 104 activates the third heater 114 and starts regeneration of the third moisture absorbing means 111 while dehumidified air to be routed towards the associated second oil expansion vessel 202 is supplied from the first demoisturizer unit 1. Then, at step 305" the second electronic unit 104 compares the level of saturation of the third moisture absorbing means 111 with a predetermined fifth threshold which may be different from the second threshold. When the detected level of saturation of the third moisture absorbing means 111 drops below the predetermined fifth threshold, the second electronic unit 104 again actuates the second valve means 103 so as to restore flow of dehumidified air to be routed towards the associated second oil expansion vessel 202 again from the third tank 110 thus going back to the situation of step 302.

Depending on the circumstances, such events at steps, 304", 305", can occur in whichever order or even at the same time with respect to the corresponding steps 304', 305'.

In practice, it has been found that the breather assembly 200 and method 300 according to the present disclosure offer a solution which is extremely flexible, simple, reliable, cost effective and gives several technical advantages with respect to prior art solutions.

Indeed, the provision of two separate demoisturizer units allows to feed dehumidified air to two different oil expansions vessels at the same time. Furthermore, the fact that at least one of the two demoisturizer units includes two distinct tanks, namely the tanks 10 and 20 which can provide both dehumidified air independently and alternately one from the other, gives the opportunity to realize different layout solutions. For example, as previously described, the same tank 10 (or 20) can provide dehumidified air to both the oil expansion vessels 201 and 202 while the tank 20 (or 10) and the tank 110 are under regeneration, or vice versa it can be even possible that the tank 110 provides dehumidified air to both the oil expansion vessels 201 and 202 while the tanks 10, 20 are under regeneration or even stopped for whichever reason. The three tanks can be identical or different to each other depending on the circumstances or the specific needs. For example, it is possible to have the two tanks 10, 20 perfectly identical with the same components and performances, or one of the two tanks (e.g., the second tank 20) can be just a back-up tank with reduced components and performances with respect to the main tank 10. For example, the tank 20 could be provided with non-regenerable moisture absorbing means which can be replaced periodically. The same can be implemented in the other two tanks 10 and 110 although the solution with regenerable moisture absorbing means is advantageous at least for the absorbing means contained into the first tank 10 and the third tank 110.

The breather assembly 200 and method 300 according to the present disclosure are susceptible of modifications and variations, all of which are within the scope of the inventive concept as defined in particular by the appended claims. Any possible combination of the previously disclosed embodiments can be implemented and has to be considered within the inventive concept of the present disclosure. All the elements can furthermore be replaced with technically equivalent elements. For example, other types of moisture absorbing means can be used, not necessarily heat-regenerable, and/or different types of sensors other than load cells can be used for detecting the level of saturation of the moisture absorbing means. As indicated above, the two electronic units 4, 104 can be part of the same and unique control unit or can be separate units which could be put in operative communication between them in whichever way, e.g. through cabling or wireless. The third tank 110 can be exactly the same or very similar to the first tank 10 and/or the second tank 20, or can be differently configured. Also, the materials used, so long as they are compatible with the specific use and purpose, as well as the dimensions, can be any according to the requirements and the state of the art.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An air dehydrating breather assembly for dehumidifying air suitable to be supplied into oil expansion vessels used in electrical devices, the assembly comprising:
    a first air demoisturizer unit configured to be connected in fluid communication with a first associated oil expansion vessel, the first air demoisturizer unit comprising:
        a first tank including first moisture absorbing means, one or more inlet openings configured to allow a flow of air to be dehumidified into the first tank, and one or more outlet openings configured to allow a flow of dehumidified air out from the first tank;
        a second tank including second moisture absorbing means, one or more second inlet openings configured to allow a flow of air to be dehumidified into the second tank, and one or more second outlet openings configured to allow a flow of dehumidified air out from the second tank;
        a first sensor operatively associated with at least the first tank and configured to detect a level of saturation of the first moisture absorbing means; and
        first valve means operatively associated with and configured to allow a flow of dehumidified air from the first tank or the second tank;
    a second air demoisturizer unit configured to be connected in fluid communication with a second associated oil expansion vessel and with the first demoisturizer unit, the second demoisturizer unit comprising:
        a third tank including third moisture absorbing means, one or more third inlet openings configured to allow a flow of air to be dehumidified into the third tank, and one or more third outlet openings configured to allow a flow of dehumidified air out from the first tank;
        a second sensor operatively associated with the third tank and configured to detect a level of saturation of the third moisture absorbing means; and
        second valve means operatively associated with the third tank; and
    electronic means operatively associated with the first sensor and the second sensor, the electronic means being configured to at least one of:
        actuate the first valve means and cause the flow of dehumidified air from the second tank towards the first oil expansion vessel when the detected level of saturation of the first moisture absorbing means exceeds a predetermined first threshold; and
        actuate the second valve means and cause the flow of dehumidified air from the first demoisturizer unit towards the second oil expansion vessel when the detected level of saturation of the third moisture absorbing means exceeds a predetermined second threshold.

2. The dehydrating breather assembly according to claim 1, wherein the first tank and the second tank are placed side by side relative to each other.

3. The dehydrating breather assembly according to claim 1, wherein the first tank and the second tank are placed one inside the other.

4. The dehydrating breather assembly according to claim 1, wherein:
    the first moisture absorbing means are heat regenerable; and
    the first tank comprises a first heater configured to regenerate the first moisture absorbing means.

5. The dehydrating breather assembly according to claim 4, wherein the electronic means comprise a first electronic unit which is operatively connected to the first sensor and is configured to activate the first heater and start regeneration of the first moisture absorbing means while dehumidified air to be routed towards the associated first oil expansion vessel is supplied from the second tank.

6. The dehydrating breather assembly according to claim 5, wherein the first electronic unit is configured to actuate the first valve means and cause the flow of dehumidified air to be routed towards the associated first oil expansion vessel again from the first tank when the detected level of saturation of the first moisture absorbing means drops below a predetermined third threshold.

7. The dehydrating breather assembly according to claim 5, wherein:
    the second moisture absorbing means are heat regenerable;
    the second tank comprises a second heater configured to regenerate the second moisture absorbing means;
    the first electronic unit is configured to activate the second heater and start regeneration of the second moisture absorbing means when dehumidified air to be routed towards the associated first oil expansion vessel is supplied again from the first tank.

8. The dehydrating breather assembly according to claim 5, comprising:
    a third sensor which is operatively associated with the second tank and configured to detect a level of saturation of the second moisture absorbing means,
    wherein the first electronic unit is configured to actuate the first valve means and cause the flow of dehumidified air again from the first tank towards the associated first oil expansion vessel when the detected level of saturation of the second moisture absorbing means exceeds a predetermined fourth threshold.

9. The dehydrating breather assembly according to claim 5, wherein the third moisture absorbing means are heat regenerable; and
    the third tank comprises a third heater configured to regenerate the third moisture absorbing means.

10. The dehydrating breather assembly according to claim 9, wherein the electronic means comprise:
    a second electronic unit which is separated from the first electronic unit and is operatively connected to the second sensor, the second electronic unit being configured to activate the third heater and start regeneration of the third moisture absorbing means while dehumidified air to be routed towards the associated second oil expansion vessel is supplied from the first demoisturizer unit.

11. The dehydrating breather assembly according to claim 10, wherein the second electronic unit is configured to actuate the second valve means and cause the flow of dehumidified air to be routed towards the associated second oil expansion vessel again from the third tank when the detected level of saturation of the third moisture absorbing means drops below a predetermined fifth threshold.

12. The dehydrating breather assembly according to claim 7,
wherein the third moisture absorbing means are heat regenerable; and
the third tank comprises a third heater configured to regenerate the third moisture absorbing means.

13. The dehydrating breather assembly according to claim 12, wherein the electronic means comprise:
a second electronic unit which is separated from the first electronic unit and is operatively connected to the second sensor, the second electronic unit being configured to activate the third heater and start regeneration of the third moisture absorbing means while dehumidified air to be routed towards the associated second oil expansion vessel is supplied from the first demoisturizer unit.

14. The dehydrating breather assembly according to claim 13, wherein the second electronic unit is configured to actuate the second valve means and cause the flow of dehumidified air to be routed towards the associated second oil expansion vessel again from the third tank when the detected level of saturation of the third moisture absorbing means drops below a predetermined fifth threshold.

15. A method for dehumidifying air suitable to be supplied into oil expansion vessels of electrical devices, the method comprising:
arranging a first air demoisturizer unit to be connected in fluid communication with a first associated oil expansion vessel, and arranging a second air demoisturizer unit to be connected in fluid communication with a second associated oil expansion vessel and with the first demoisturizer unit,
wherein the first air demoisturizer unit includes:
a first tank containing a first moisture absorber, one or more inlet openings for allowing a flow of air to be dehumidified into the first tank, and one or more outlet openings for allowing flow of dehumidified air out from the first tank;
a second tank containing a second moisture absorber, one or more second inlet openings for allowing a flow of air to be dehumidified into the second tank, and one or more second outlet openings for allowing a flow of dehumidified air out from the second tank;
a first sensor operatively associated with at least the first tank for detecting a level of saturation of the first moisture absorber; and
a first valve operatively associated with and configured to allow a flow of dehumidified air from the first tank or the second tank, wherein the second demoisturizer unit includes:
a third tank containing a third moisture absorber, one or more third inlet openings for allowing a flow of air to be dehumidified into the third tank, and one or more third outlet openings for allowing a flow of dehumidified-air out from the first tank;
a second sensor operatively associated with the third tank for detecting a level of saturation of the third moisture absorber; and
a second valve means operatively associated with the third tank, and wherein the method comprises, in whichever order:
actuating, by an associated electronic processing unit, (i) the first valve and causing the flow of dehumidified air from the second tank towards the first oil expansion vessel when the detected level of saturation of the first moisture absorber exceeds a predetermined first threshold; and (ii) the second valve and causing the flow of dehumidified air from the first demoisturizer unit towards the second oil expansion vessel when the detected level of saturation of the third moisture absorber exceeds a predetermined second threshold.

16. The method according to claim 15, wherein:
the first moisture absorber is heat regenerable;
a first heater is provided inside the first tank for regenerating the first moisture absorber; and
the method includes activating, by the electronic processing unit, the first heater and starting regeneration of the first moisture absorber while dehumidified air to be routed towards the associated first oil expansion vessel is supplied from the second tank.

17. The method according to claim 16, comprising:
comparing the level of saturation of the first moisture absorber with a predetermined third threshold and actuating the first valve to cause the flow of dehumidified air to be routed towards the associated first oil expansion vessel again from the first tank when the detected level of saturation of the first moisture absorber drops below a predetermined third threshold.

18. The method according to claim 16, wherein:
the second moisture absorber is heat regenerable;
a second heater is provided inside the second tank for regenerating the second moisture absorber; and
the method includes activating, by the electronic processing unit, the second heater and starting regeneration of the second moisture absorber when dehumidified air to be routed towards the associated first oil expansion vessel is supplied again from the first tank.

19. The method according to claim 18, wherein:
the third moisture absorber is heat regenerable;
a third heater is provided inside the third tank for regenerating the third moisture absorber; and
the method includes activating, by the electronic processing unit, the third heater and starting regeneration of the third moisture absorber while dehumidified air to be routed towards the associated second oil expansion vessel is supplied from the first demoisturizer unit.

20. The method according to claim 16, comprising:
comparing the level of saturation of the third moisture absorber with a predetermined fifth threshold and actuating the second valve to cause the flow of dehumidified air to be routed towards the associated second oil expansion vessel again from the third tank when the detected level of saturation of the third moisture absorbing means drops below the predetermined fifth threshold.

* * * * *